United States Patent [19]

Yamano et al.

[11] Patent Number: 4,708,387
[45] Date of Patent: Nov. 24, 1987

[54] TAKE-DOWN SEAT FOR AUTOMOBILE

[75] Inventors: Eiiti Yamano; Yoshihiko Yamauchi, both of Kanagawa, Japan

[73] Assignee: Ikeda Bussan Co., Ltd., Ayase, Japan

[21] Appl. No.: 810,559

[22] Filed: Dec. 19, 1985

[30] Foreign Application Priority Data

Jan. 30, 1985 [JP] Japan .............................. 60-11432[U]

[51] Int. Cl.4 .............................................. B60N 1/10
[52] U.S. Cl. ......................................... 296/63; 297/15
[58] Field of Search .............. 296/63, 65 R; 297/440, 297/15

[56] References Cited

U.S. PATENT DOCUMENTS

| 267,382 | 11/1882 | Underhill et al. ...................... 297/15 |
| 1,326,737 | 12/1919 | Johnson .................................. 297/15 |
| 4,118,061 | 10/1978 | Atkinson et al. ...................... 296/63 |
| 4,311,337 | 1/1982 | Brunn .................................. 297/440 |

FOREIGN PATENT DOCUMENTS

| 2107435 | 9/1971 | Fed. Rep. of Germany ........ 296/63 |
| 653297 | 2/1963 | Italy ..................................... 297/440 |
| 56-14116 | 4/1981 | Japan . |
| 150512 | 6/1955 | Sweden ............................... 297/440 |

Primary Examiner—David A. Scherbel
Assistant Examiner—Carol L. Olson
Attorney, Agent, or Firm—Schwartz, Jeffery, Schwaab, Mack, Blumenthal & Evans

[57] ABSTRACT

Herein disclosed is a take-down seat for an automobile, which comprises a pair of side supports pivotally connected to the floor of the vehicle, seat cushion and seat back portions detachably mounted to the side supports to constitute a back-mounted rear seat on the floor.

9 Claims, 4 Drawing Figures

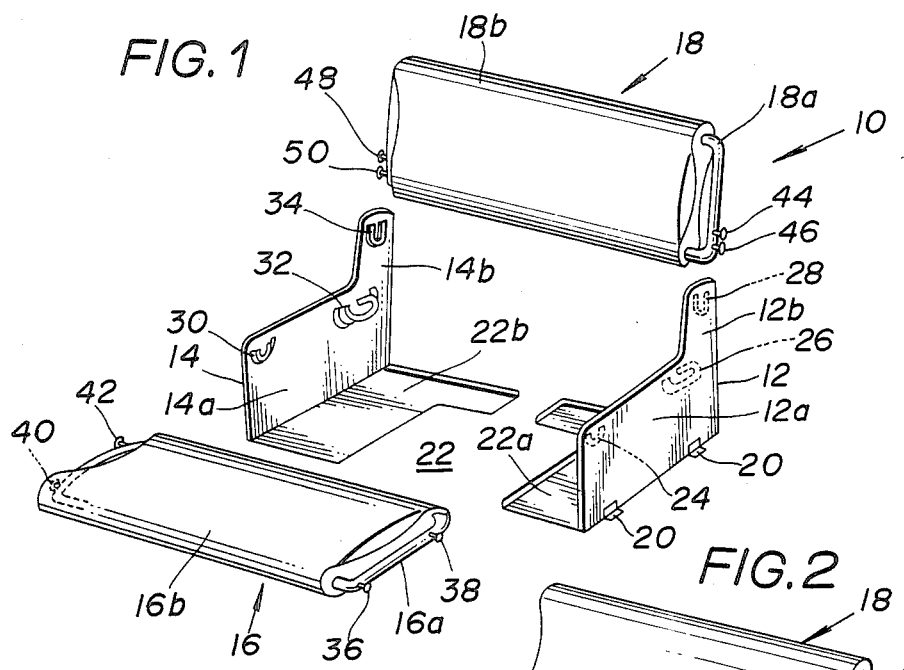
FIG. 1
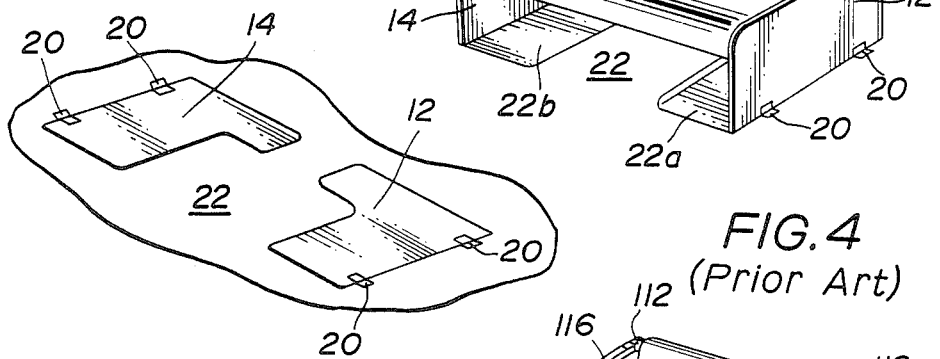
FIG. 2
FIG. 3
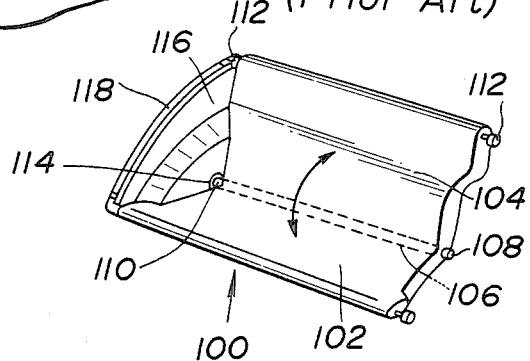
FIG. 4 (Prior Art)

4,708,387

TAKE-DOWN SEAT FOR AUTOMOBILE

BACKGROUND OF THE INVENTION

1. Field of the Invention

The present invention relates in general to a seat for an automobile, and more particluarly to a rear seat of "take-down" type wherein the seat cushion portion and the seat back portion are easily dismantled from their practically set positions for increasing a luggage space of the vehicle.

2. Description of the Prior Art

In automobiles for commercial use or the like (such as a station wagon or van), a so-called "foldable seat" is usually employed as a rear seat for obtaining enlarged luggage space when the vehicle is used as a luggage carrying car. In fact, upon requirement of the enlarged luggage space, the seat back portion of the rear seat is folded forward and put on the seat cushion portion of the seat. With this, the space above the folded seat can be used as an additional or extra luggage space. However, as will be seen as the description proceeds, some of the conventional foldable rear seats have some drawbacks due to the inherent constructions thereof and thus limit the automotive field where they are practically used.

SUMMARY OF THE INVENTION

Therefore, it is an object of the present invention to provide an improved take-down seat which is applicable to various types of automobiles.

It is another object of the present invention to provide an improved take-down seat which is simple in construction.

According to the present invention, there is provided, in an automobile having a floor, a take-down seat arrangement which comprises a pair of side supports which are spaced from each other and pivotally connected to the floor, each side support being pivotal from a folded position wherein the side support lies on the floor to a stand position wherein the side support stands on the floor, a seat cushion portion, a seat back portion, and means for detachably mounting the seat cushion and seat back portions on the side supports in the stand position in such a manner that the seat cushion and seat back portions constitute a back-mounted seat on the floor.

BRIEF DESCRIPTION OF THE DRAWINGS

Other objects and advantages of the present invention will become apparent from the following description when taken in conjunction with the accompanying drawings, in which:

FIG. 1 is an exploded perspective view of a take-down seat according to the present invention;

FIG. 2 is a perspective view of the take-down seat of the invention in assembled condition;

FIG. 3 is a perspective view showing the condition wherein side supports are folded into respective recesses formed in the floor of the vehicle; and FIG. 4 is a perspective view of a conventional foladable rear seat for an automobile

DESCRIPTION OF A CONVENTIONAL FOLDABLE REAR SEAT

Prior to describing in detail the present invention, one conventional foldable rear seat will be described with reference to FIG. 4 in order to clarify the task of the present invention.

In FIG. 4, there is shown a conventional foldable rear seat 100 for an automobile for commercial use or the like (such as a station wagon or van) wherein a temporary rear seat is required.

The seat 100 comprises a seat cushion portion 102 and a foldable seat back portion 104. A hinge device 106 is arranged between the two portions 102 and 104 for achieving the folding movement of the seat back portion 104 relative to the seat cushion portion 102. The hinge device 106 has pins 108 and 110 which project laterally outward from the seat 100. The seat back portion 104 is equipped at the upper sides with respective guide pins 112 (only one is seen in the drawing). Upon assembling the seat 100 on the vehicle, the hinge pins 108 and 110 are received in openings 114 (only one is shown) formed in side walls 116 of the vehicle, and the guide pins 112 are slidably received in curved grooves 118 formed in the side walls 116. With this arrangement, the seat back portion 104 is pivotally movable forward and backward about the hinge device 106 with the guide pins 112 slidably moved in the associated grooves 118. Although not shown in the drawing, suitable lock devices are incorporated with the seat back portion 104 to hold the same at a predetermined stand position.

However, the above-mentioned conventional foldable rear seat 100 has the following drawbacks. That is, since the side walls 116 of the vehicle are used as major parts for supporting the seat 100, it is impossible or at least difficult to provide the side walls with desirable side door openings at the positions beside the seat 100. Thus, the types of the automobiles to which the conventional foldable rear seat 100 is applicable are considerably limited. Furthermore, mounting of the seat 100 to the vehicle is troublesome because of the one-unit construction of the seat cushion portion 102 and the seat back portion 104.

DETAILED DESCRIPTION OF THE INVENTION

Referring to FIGS. 1 to 3, particularly FIG. 1, there is shown an improved take-down seat arrangement according to the present invention, which is free of the above-mentioned drawbacks. The take-down seat 10 according to the present invention comprises generally a pair of side supports 12 and 14, a seat cushion portion 16 and a seat back portion 18. The side supports 12 and 14 are spaced apart from each other by the distance corresponding to the longitudinal length of seat cushion portion 16 and pivotally connected through hinges 20 to the floor 22 of the vehicle. Preferably, the side supports 12 and 14 are constructed of wood for improving external appearance of the seat. Each side support 12 or 14 hereinshown is generally L-shaped, which includes a seat cushion support part 12a or 14a and a seat back support part 12b or 14b.

The floor 22 is formed with two recesses 22a and 22b between the side supports 12 and 14. More particularly, each recess 22a or 22b is shaped and sized to match with the corresponding side support 12 or 14 and positioned to neatly receive therein the corresponding side support 12 or 14 when the latter is folded. Although not shown in the drawings, suitable stoppers are arranged in the recesses 22a and 22b so that, upon folding of the side supports 12 and 14, the upper or exposed surfaces of the folded side supports 12 and 14 become substantially flush with the major surface of the floor 22, as is seen from FIG. 3. Each side support 12 or 14 is equipped at its inboard side with three spaced holders 24, 26 and 28 (or 30, 32 and 34). As is seen from FIG. 1, the holders 24 and 26 (or 30 and 32) are secured to the upper portion of the seat cushion support 12a (or 14a). The front holder 24 (or 30) has a recess (no numeral) facing upward, while the intermediate holder 26 (or 32) has a curved recess (no numeral) which extends downward from the upper edge of the bracket 26 (or 32) and then extends rearward, as shown. The rear holder 28 (or 34) is secured to the upper portion of the seat back support 12b (or 14b) and has a recess (no numeral) facing upward.

The seat cushion portion 16 comprises a rectangular pipe frame 16a, a cushion material 16b covering the frame 16a except the longitudinal sides of the same and an outer skin member (no numeral) covering the cushion material 16b. The frame 16a is equipped at each longitudinal side with two support pins 36 and 38 (or 40 and 42) which are spaced by the distance corresponding to that between the front and intermediate holders 24 and 26 (or 30 and 32).

The seat back portion 18 comprises a rectangular pipe frame 18a, a cushion material 18b covering the frame 18a except the longitudinal sides of the same and an outer skin member (no numeral) covering the cushion material 18b. The frame 18a is equipped at each longitudinal side with two support pins 44 and 46 (or 48 and 50) which are arranged close to each other.

Upon assembling the seat 10, the side supports 12 and 14 are pivotally raised up, and with the side supports 12 and 14 kept raised, the seat back portion 18 is brought into the space between the side supports 12 and 14 bringing the support pins 44, 46, 48 and 50 thereof into engagement with the rear holders 28 and 34. With this, the seat back portion 18 is held by the seat back support parts 12b and 14b of the side supports 12 and 14. Then, the seat cushion portion 16 is brought into the space between the side supports 12 and 14 bringing the support pins 38 and 42 thereof into engagement with the intermediate holders 26 and 32. Then, the seat cushion portion 16 is pushed rearward allowing the pins 38 and 42 to move in the recesses of the holders 26 and 32 rearwardly, and then the front support pins 36 and 40 of the seat cushion portion 16 are brought into engagement with the front holders 24 and 30. With this, the seat cushion portion 16 is held by the side supports 12 and 14 and thus assembly of the seat 10 is accomplished.

Upon requirement of dismantling the seat 10, the seat cushion portion 16 and the seat back portion 18 are dismantled from the side supports 12 and 14 by carrying out a reversed process to the above-mentioned one. Then, the side supports 12 and 14 are folded into the corresponding recesses 22a and 22b in a manner as shown in FIG. 3. The dismantled seat cushion portion 16 and the seat back portion 18 may be put in the place where shipping and discharging of luggage is not affected. With this, the luggage space defined behind front seats (not shown) is increased. Furthermore, since the side supports 12 and 14 are folded into the recesses of the floor in such a manner that the exposed outer surfaces thereof are flush with the floor, a luggage space having a flat floor is obtained.

Although, in the above-mentioned arrangement, the holders 24, 26, 28, 30, 32 and 34 are used for mounting the seat cushion and seat back portions 16 and 18 to the side supports 12 and 14, these holders may be replaced with suitable supporting holes which are formed directly in the side suports 12 and 14. In this case, the support pins of the seat cushion and seat back portions are engaged with the support holes upon assembly of the seat.

As will be understood from the foregoing description, in the present invention, the side walls of the automobile are not used as parts for supporting the seat. Thus, formation of the side door openings in the side walls beside the rear seat is easily and desirably achieved, unlike in the case of the afore-mentioned conventional foldable rear seat. Thus, the take-down seat of the present invention is applicable to various types of automobiles.

What is claimed is:

1. An automobile seat assembly comprising:
    a floor comprising a pair of spaced recesses;
    a pair of side supports, each of said side supports having a shape substantially identical to a corresponding one of said spaced recesses, each of said side supports being pivotally connected to said floor adjacent to one of said corresponding recesses so that each of said side supports is pivotal from a folded position wherein said side support is received in said corresponding recess, to an upright position;
    a seat cushion;
    a seat back; and
    means for detachably mounting said seat cushion and said seat back on said side supports when in said upright position so as to form a seat having a back rest, wherein said seat cushion and said seat back are completely removable from the automobile so as to increase the amount of overall luggage area.

2. An automobile seat assembly as claimed in claim 1, wherein said means for mounting comprises:
    a plurality of holders secured to the inboard sides of said side supports; and
    a plurality of support pins secured to longitudinal ends of said seat cushion and said seat back, whereby upon assembling the seat, said seat cushion and said seat back are mounted on said side supports when in said upright position with said support pins thereof suspended by said holders.

3. An automobile seat assembly as claimed in claim 1, wherein each of said side supports is substantially L-shaped, each of said supports comprising a seat cushion support part to which said seat cushion is detachably connected and a seat back support portion to which said seat back is detachably connected.

4. An automobile seat assembly as claimed in claim 1, wherein said recesses are disposed between said side supports.

5. An automobile seat assembly as claimed in claim 1, wherein each of said side supports is connected to said floor through hinges.

6. An automobile seat assembly as claimed in claim 1, wherein each of said seat cushion and said seat back comprise:
    a rectangular pipe frame;
    a cushion material covering said rectangular pipe frame except the longitudinal ends of the frame; and
    an outer skin member covering said cushion material.

7. An automobile seat assembly as claimed in claim 1, wherein each of said side supports, when in said folded position, has an exposed outer surface thereof substantially flush with said floor.

8. An automobile seat assembly as claimed in claim 1, wherein said side supports are pivotable laterally toward one another into said recesses.

9. An automobile seat assembly as claimed in claim 8, wherein said exposed outer surface comprises the laterally outside surface of each of said side supports.

* * * * *